US009117370B1

(12) United States Patent
Jensen et al.

(10) Patent No.: US 9,117,370 B1
(45) Date of Patent: Aug. 25, 2015

(54) SYSTEM AND METHOD FOR IDENTIFYING RUNWAY POSITION DURING AN INTERSECTION TAKEOFF

(71) Applicant: HONEYWELL INTERNATIONAL INC., Morristown, NJ (US)

(72) Inventors: Matthew Pearson Jensen, Peoria, AZ (US); Ivan Sandy Wyatt, Scottsdale, AZ (US); Thea L. Feyereisen, Hudson, WI (US); Aaron Gannon, Anthem, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 14/205,612

(22) Filed: Mar. 12, 2014

(51) Int. Cl.
*G06F 19/00* (2011.01)
*B64F 1/20* (2006.01)
*G01C 21/00* (2006.01)
*G08G 5/06* (2006.01)

(52) U.S. Cl.
CPC .................................... *G08G 5/065* (2013.01)

(58) Field of Classification Search
CPC ... G08G 5/025; G08G 5/0021; G08G 5/0086; G08G 5/006; G08G 5/065; G01C 23/005; G01C 23/00; G01C 21/20; G01C 5/005; B64C 25/426; G09G 29/007; G09G 29/10; G05D 1/0083
USPC ........... 701/3, 4, 5, 6, 7, 8, 10, 15, 16, 18, 24, 701/25, 26, 27, 38; 340/963, 967–970, 973, 340/974, 975, 977, 978
See application file for complete search history.

(56) References Cited

U.S. PATENT DOCUMENTS

| | | | | |
|---|---|---|---|---|
| 6,978,205 | B2 * | 12/2005 | Ryan et al. | 701/120 |
| 8,193,948 | B1 * | 6/2012 | Shapiro et al. | 340/965 |
| 8,380,372 | B2 | 2/2013 | Michal et al. | |
| 2004/0167685 | A1 * | 8/2004 | Ryan et al. | 701/16 |
| 2005/0182530 | A1 * | 8/2005 | Murphy | 701/16 |
| 2005/0182531 | A1 * | 8/2005 | Ryan et al. | 701/16 |
| 2006/0227014 | A1 * | 10/2006 | Gannon | 340/972 |
| 2007/0106433 | A1 * | 5/2007 | He | 701/16 |
| 2008/0215198 | A1 | 9/2008 | Richards | |
| 2013/0231853 | A1 | 9/2013 | Feyereisen et al. | |

FOREIGN PATENT DOCUMENTS

| | | | |
|---|---|---|---|
| EP | 2650858 | A2 | 10/2013 |

* cited by examiner

*Primary Examiner* — Muhammad Shafi
(74) *Attorney, Agent, or Firm* — Ingrassia Fisher & Lorenz, P.C.

(57) ABSTRACT

A system and method for determining if an aircraft is headed in the right direction on a runway entered upon at a location that does not display runway identification comprises receiving runway and aircraft position data for determining the identity of the runway. The identity of the runway is then compared with a representation of an assigned runway stored on the aircraft to determine that they match.

16 Claims, 4 Drawing Sheets

SYSTEM AND METHOD FOR IDENTIFYING RUNWAY POSITION DURING AN INTERSECTION TAKEOFF

TECHNICAL FIELD

Embodiments of the subject matter described herein relate generally to avionics systems such as flight display systems and, more particularly, to a flight deck display system that generates a synthetic display of an airport runway that includes a graphical representation of runway identification and position.

BACKGROUND

Modern flight deck displays for vehicles (such as aircraft or spacecraft) display a considerable amount of information, such as vehicle position, runway identification, speed, altitude, attitude, navigation, target, and terrain information. Many synthetic vision systems attempt to reproduce the real-world appearance of an airport field, including items such as terminal buildings, taxiway signs, and runway signs. The primary perspective view used in a Synthetic Vision Systems (SVS) emulates a forward-looking cockpit viewpoint. Such a view is intuitive and provides helpful visual information to the pilot and crew, especially during airport approaches and taxiing. In this regard, synthetic display systems for aircraft are beginning to employ realistic simulations of airports that include details such as runways, taxiways, buildings, etc. For example, it is known to provide a pilot with visual and audible alerts (including displayed graphics) that identify a runway and indicate remaining runway distance.

Improper identification of a runway may, in some cases, compromise safety. While an SVS is attempting to accurately portray the scene in front of an aircraft, it displays runway markings at the beginning of a runway as seen looking out the front of the aircraft. However, aircraft often perform "intersection" takeoffs (e.g. beginning a takeoff roll from a taxiway intersection some distance down the runway). In such cases, there is no indication (e.g. signage, markings, etc.) identifying the runway. Furthermore, if two runways converge to a point, a pilot may believe that he or she is on the correct runway when, in fact, the aircraft may be pointed down a different runway.

In addition, takeoff calculations are made assuming that the entire length of the runway is available for takeoff. In the case of an intersecting runway, there are no markings or indications that sufficient runway remains unless the intersection is at a multiple of one thousand feet down the runway, and a crew-member is, in fact, able to see the markings on the runway either visually or on the SVS. Thus, there may not be sufficient runway remaining to perform a safe takeoff.

Accordingly, it would be desirable to increase a pilot's situational awareness during an intersection takeoff by providing an onboard avionics system and method that provides a pilot with graphic and/or aural indications identifying the runway and the remaining runway distance. Furthermore, other desirable features and characteristics will become apparent from the subsequent detailed description and the appended claims, taken in conjunction with the accompanying drawings and the foregoing technical field and background.

BRIEF SUMMARY

A method is provided for determining if an aircraft is headed in the right direction on a runway entered upon at a location that does not display runway identification. The method comprises receiving runway data, receiving aircraft position data, and determining the identity of the runway from the runway data and the aircraft position data. This identity is compared with a representation of an assigned runway stored on the aircraft to determine if they match.

A method for entering a runway at an intersection is also provided and comprises receiving runway data; receiving aircraft position data and determining the identity of the runway from the runway data and the aircraft position data. The identity of the runway is compared with a representation of an assigned runway stored on the aircraft to determine that they match. A balanced field length is retrieved, and a remaining runway distance is determined from the runway data and the position data. The remaining runway distance is displayed in a first manner if the remaining runway distance is greater that the balanced field length and in a second manner if the remaining runway distance is less than the balanced field length.

A system for determining if an aircraft is headed in the right direction on a runway entered upon at a location that does not display runway identification is also provided. The system comprises a first source of runway data, a second source of aircraft position data, and a processor coupled to the first and second sources. The processor is configured to (1) determine the identity of the runway from the runway data and the aircraft position data, and (2) compare the identity of the runway with a representation of an assigned runway stored on the aircraft to determine if they match.

BRIEF DESCRIPTION OF THE DRAWINGS

A more complete understanding of the subject matter may be derived by referring to the following detailed description and claims when considered in conjunction with the following figures, wherein like reference numbers refer to similar elements throughout the figures.

DETAILED DESCRIPTION

Figure 1:
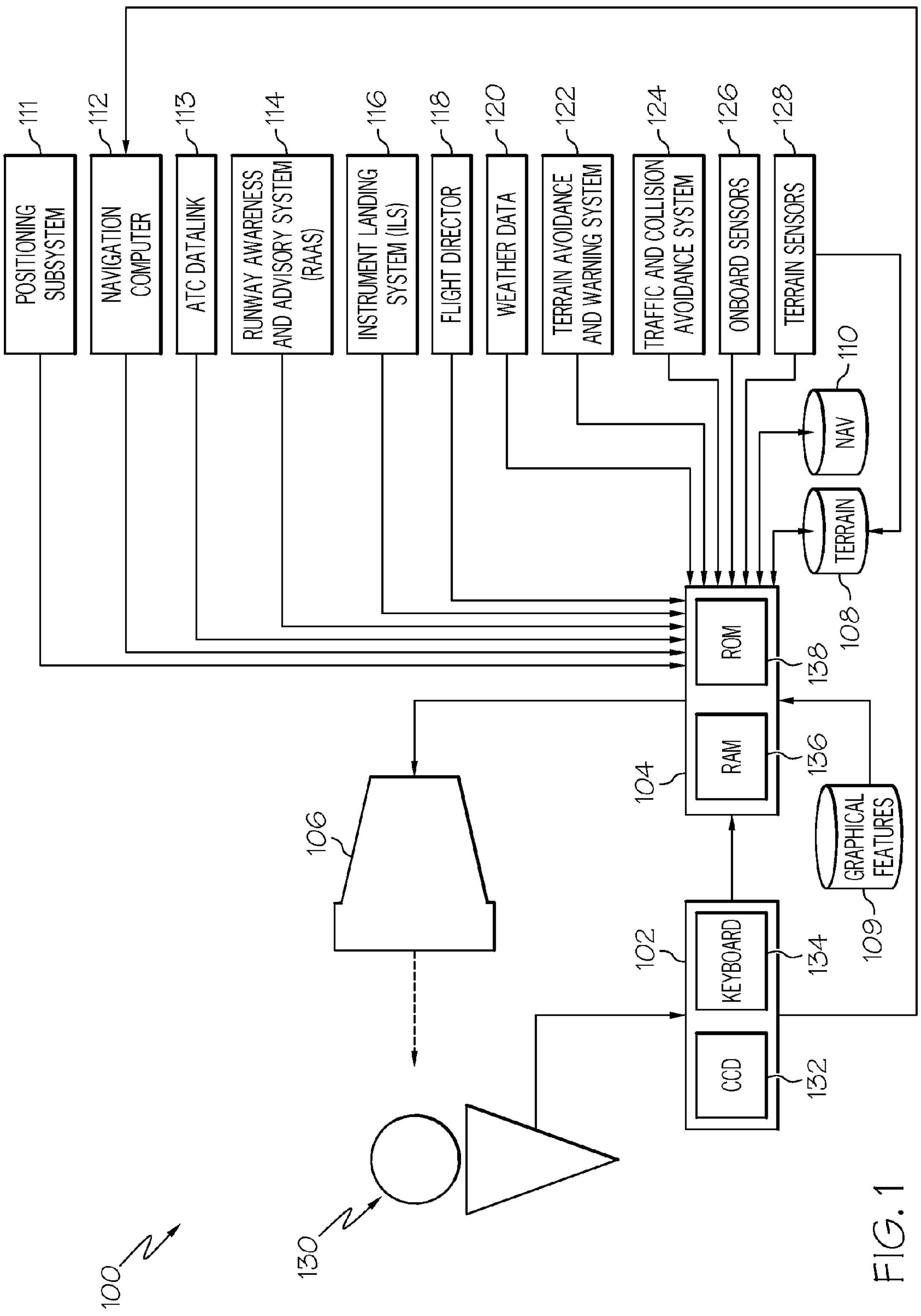
FIG. 1 is a schematic representation of an embodiment of a flight deck display system.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The system and methods described herein can be deployed with any vehicle, including aircraft, automobiles, spacecraft, watercraft, and the like. The preferred embodiments of the system and methods described herein represent an intelligent way to present visual airport information to a pilot or flight crew during operation of the aircraft and, in particular, during the execution of an intersection takeoff.

Embodiments described herein contemplate the display of a placard that graphically identifies the runway that the aircraft is on and moves along with the aircraft on the SVD. To reduce unnecessary clutter, this placard may be extinguished as the aircraft accelerates on takeoff. For example, the aircraft could "run over" the placard when the aircraft exceeds a speed above normal taxi speed (e.g. thirty knots). As the aircraft takes the runway, the heading and position of the aircraft are compared to the runway entered into the FMS as the desired takeoff runway. If the aircraft heading, runway position, and FMS takeoff data agree, then the placard runway number will be displayed in a first color (e.g. green). If they do not agree, the runway number will be displayed in a second color (e.g. red or yellow). The same display color convention may also be applicable to the symbology graphically representing the aircraft speed down the runway.

It is further contemplated that to aid in determining if there is sufficient runway remaining for a safe takeoff, the distance remaining to the end of the runway may be graphically displayed under the runway number. This may be compared to the safe runway distance required for takeoff (e.g., the balanced field length) computed by the Flight Management System (FMS). If the runway remaining is greater than the balanced field length, then the distance remaining may be displayed in a first color (e.g. green). However, if the distance remaining is less than the balanced field length, the distance will be displayed in a second color (e.g. bold red) to indicate that there is insufficient runway remaining for takeoff.

As FIG. 1 shows, the processor architecture 104 is in operable communication with the source of weather data 120, the TAWS 122, and the TCAS 124, and is additionally configured to generate, format, and supply appropriate display commands to the display element 106 so that the avionics data, the weather data 120, data from the TAWS 122, data from the TCAS 124, and data from the previously mentioned external systems may also be selectively rendered in graphical form on the display element 106. The data from the TCAS 124 can include Automatic Dependent Surveillance Broadcast (ADS-B) messages.

The terrain database 108 includes various types of data, including elevation data, representative of the terrain over which the aircraft is flying. The terrain data can be used to generate a three dimensional perspective view of terrain in a manner that appears conformal to the earth. In other words, the display emulates a realistic view of the terrain from the flight deck or cockpit perspective. The data in the terrain database 108 can be pre-loaded by external data sources or provided in real-time by the terrain sensor 128. The terrain sensor 128 provides real-time terrain data to the processor architecture 104 and/or the terrain database 108. In one embodiment, terrain data from the terrain sensor 128 is used to populate all or part of the terrain database 108, while in another embodiment, the terrain sensor 128 provides information directly, or through components other than the terrain database 108, to the processor architecture 104.

In another embodiment, the terrain sensor 128 can include visible, low-light TV, infrared, or radar-type sensors that collect and/or process terrain data. For example, the terrain sensor 128 can be a radar sensor that transmits radar pulses and receives reflected echoes, which can be amplified to generate a radar signal. The radar signals can then be processed to generate three-dimensional orthogonal coordinate information having a horizontal coordinate, vertical coordinate, and depth or elevation coordinate. The coordinate information can be stored in the terrain database 108 or processed for display on the display element 106.

In one embodiment, the terrain data provided to the processor architecture 104 is a combination of data from the terrain database 108 and the terrain sensor 128. For example, the processor architecture 104 can be programmed to retrieve certain types of terrain data from the terrain database 108 and other certain types of terrain data from the terrain sensor 128. In one embodiment, terrain data retrieved from the terrain sensor 128 can include moveable terrain, such as mobile buildings and systems. This type of terrain data is better suited for the terrain sensor 128 to provide the most up-to-date data available. For example, types of information such as water-body information and geopolitical boundaries can be provided by the terrain database 108. When the terrain sensor 128 detects, for example, a water-body, the existence of such can be confirmed by the terrain database 108 and rendered in a particular color such as blue by the processor architecture 104.

The navigation database 110 includes various types of navigation-related data stored therein. In preferred embodiments, the navigation database 110 is an onboard database that is carried by the aircraft. The navigation-related data include various flight plan related data such as, for example, and without limitation: waypoint location data for geographical waypoints; distances between waypoints; track between waypoints; data related to different airports; navigational aids; obstructions; special use airspace; political boundaries; communication frequencies; and aircraft approach information. In one embodiment, combinations of navigation-related data and terrain data can be displayed. For example, terrain data gathered by the terrain sensor 128 and/or the terrain database 108 can be displayed with navigation data such as waypoints, airports, etc. from the navigation database 110, superimposed thereon.

Although the terrain database 108, the graphical features database 109, and the navigation database 110 are, for clarity and convenience, shown as being stored separate from the processor architecture 104, all or portions of these databases 108, 109, 110 could be loaded into the onboard RAM 136, stored in the ROM 138, or integrally formed as part of the processor architecture 104. The terrain database 108, the graphical features database 109, and the navigation database 110 could also be part of a device or system that is physically separate from the system 100.

The positioning subsystem 111 is suitably configured to obtain geographic position data for the aircraft. In this regard, the positioning subsystem 111 may be considered to be a source of geographic position data for the aircraft. In practice, the positioning subsystem 111 monitors the current geographic position of the aircraft in real-time, and the real-time geographic position data can be used by one or more other subsystems, processing modules, or equipment on the aircraft (e.g., the navigation computer 112, the RAAS 114, the ILS 116, the flight director 118, the TAWS 122, or the TCAS 124). In certain embodiments, the positioning subsystem 111 is realized using global positioning system (GPS) technologies that are commonly deployed in avionics applications. Thus, the geographic position data obtained by the positioning subsystem 111 may represent the latitude and longitude of the aircraft in an ongoing and continuously updated manner.

The avionics data that is supplied from the onboard sensors 126 includes data representative of the state of the aircraft such as, for example, aircraft speed, altitude, attitude (i.e., pitch and roll), heading, groundspeed, turn rate, etc. In this regard, one or more of the onboard sensors 126 may be considered to be a source of heading data for the aircraft. The onboard sensors 126 can include MEMS-based, ADHRS-related or any other type of inertial sensor. As understood by those familiar with avionics instruments, the aircraft status data is preferably updated in a continuous and ongoing manner.

The weather data 120 supplied to the processor architecture 104 is representative of at least the location and type of various weather cells. The data supplied from the TCAS 124 includes data representative of other aircraft in the vicinity, which may include, for example, speed, direction, altitude, and altitude trend. In certain embodiments, the processor architecture 104, in response to the TCAS data, supplies appropriate display commands to the display element 106 such that a graphic representation of each aircraft in the vicinity is displayed on the display element 106. The TAWS 122 supplies data representative of the location of terrain that may be a threat to the aircraft. The processor architecture 104, in response to the TAWS data, preferably supplies appropriate display commands to the display element 106 such that the potential threat terrain is displayed in various colors depending on the level of threat. For example, red is used for warnings (immediate danger), yellow is used for cautions (possible danger), and green is used for terrain that is not a threat. It will be appreciated that these colors and number of threat levels are merely exemplary, and that other colors and different numbers of threat levels can be provided as a matter of choice.

As was previously alluded to, one or more other external systems (or subsystems) may also provide avionics-related data to the processor architecture 104 for display on the display element 106. In the depicted embodiment, these external systems include a flight director 118, an instrument landing system (ILS) 116, runway awareness and advisory system (RAAS) 114, and navigation computer 112. The flight director 118, as is generally known, supplies command data representative of commands for piloting the aircraft in response to flight crew entered data, or various inertial and avionics data received from external systems. The command data supplied by the flight director 118 may be supplied to the processor architecture 104 and displayed on the display element 106 for use by the user 130, or the data may be supplied to an autopilot (not illustrated). The autopilot, in turn, produces appropriate control signals that cause the aircraft to fly in accordance with the flight crew entered data, or the inertial and avionics data.

The ILS 116 is a radio navigation system that provides the aircraft with horizontal and vertical guidance just before and during landing and, at certain fixed points, indicates the distance to the reference point of landing. The system includes ground-based transmitters (not shown) that transmit radio frequency signals. The ILS 116 onboard the aircraft receives these signals and supplies appropriate data to the processor for display.

The RAAS 114 provides improved situational awareness to help lower the probability of runway incursions by providing timely aural advisories to the flight crew during taxi, takeoff, final approach, landing and rollout. The RAAS 114 uses GPS data to determine aircraft position and compares aircraft position to airport location data stored in the navigation database 110 and/or in the graphical features database 109. Based on these comparisons, the RAAS 114, if necessary, issues appropriate aural advisories. Aural advisories, which may be issued by the RAAS 114, inform the user 130, among other things of when the aircraft is approaching a runway, either on the ground or from the air at times such as when the aircraft has entered and is aligned with a runway, when the runway is not long enough for the particular aircraft, the distance remaining to the end of the runway as the aircraft is landing or during a rejected takeoff, when the user 130 inadvertently begins to take off from a taxiway, and when an aircraft has been immobile on a runway for an extended time. During approach, data from sources such as GPS, including RNP and RNAV, can also be considered.

The navigation computer 112 is used, among other things, to allow the user 130 to program a flight plan from one destination to another. The navigation computer 112 may be in operable communication with the flight director 118. As was mentioned above, the flight director 118 may be used to automatically fly, or assist the user 130 in flying, the programmed route. The navigation computer 112 is in operable communication with various databases including, for example, the terrain database 108 and the navigation database 110. The processor architecture 104 may receive the programmed flight plan data from the navigation computer 112 and cause the programmed flight plan, or at least portions thereof, to be displayed on the display element 106.

The ATC datalink subsystem 113 is utilized to provide air traffic control data to the system 100, preferably in compliance with known standards and specifications. Using the ATC datalink subsystem 113, the processor architecture 104 can receive air traffic control data from ground based air traffic controller stations and equipment. In turn, the system 100 can utilize such air traffic control data as needed. For example, taxi maneuver clearance may be provided by an air traffic controller using the ATC datalink subsystem 113.

In operation, a flight deck display system as described herein is suitably configured to process the current real-time geographic position data, the current real-time heading data, the airport feature data including runway data, and possibly other data to generate image rendering display commands for the display element 106. Thus, the synthetic graphical representation of an airport field rendered by the flight deck display system will be based upon or otherwise influenced by at least the geographic position and heading data and the airport and runway feature data.

In accordance with an embodiment, it is contemplated that a placard be displayed on the runway indicating which runway the aircraft is on after entering the runway via an intersection. To reduce clutter, it is contemplated that the displayed placard will disappear as the aircraft accelerates on takeoff. The aircraft might overtake (i.e. "run over") the placard at some predetermined speed; e.g. thirty knots. As the aircraft enters the runway, the aircraft position and heading are compared with the runway data entered into the FMS representing the desired runway for takeoff. If the aircraft heading, runway position, and FMS takeoff data do not agree, then the system will turn the placarded runway number a predetermined color (e.g. red or yellow).

It is further contemplated that to determine if there is sufficient runway remaining for a safe takeoff, the distance remaining to the end of the runway will be displayed under the runway number. The system may compare this number with the computed safe takeoff performance distance (i.e. the balanced field length) determined by the FMS for takeoff. If the remaining runway is greater than the balanced field length, the runway distance remaining may be displayed in a first color; e.g. green. If, however, the remaining runway is less than the balanced field length, the runway distance remaining may be displayed in a second color (e.g. red) and/or in bold lettering to indicate that that there is insufficient runway distance remaining for takeoff.

Figure 2:
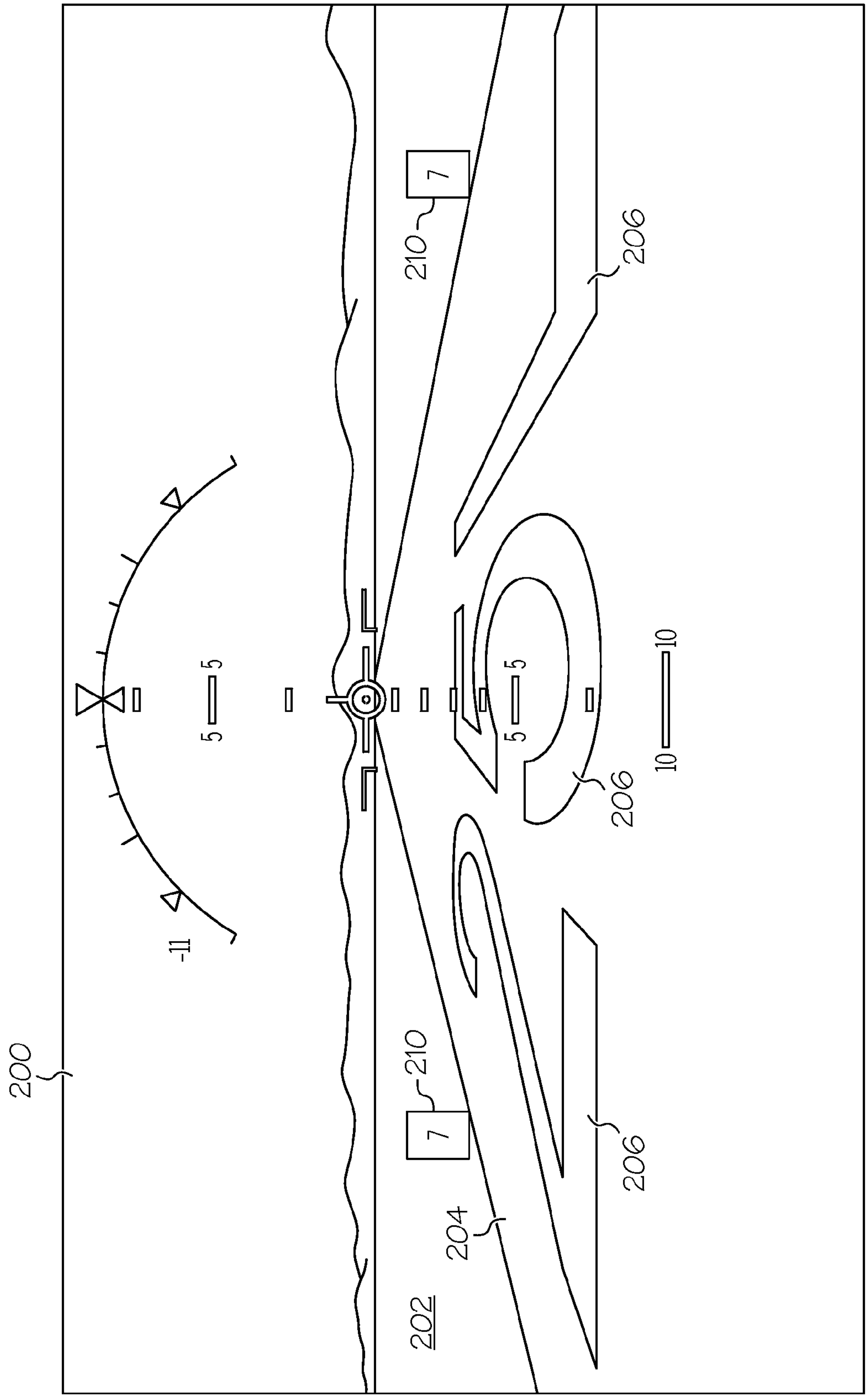
FIG. 2 is a graphical representation of a synthetic display having rendered thereon an airport field and related runway signage.

FIG. 2 depicts a synthetic display 200 of an exemplary airport field 202 at a particular moment in time as viewed from inside the cockpit of a landing aircraft. The synthetic display 200 also may include graphical representations of various features, structures, fixtures, and/or elements associated with the airport field 202 not shown here for clarity. For example, the synthetic display 200 includes graphical representations of, without limitation: taxiway markings; a ramp area and related markings; parking guidance lines and parking stand lines; landscape features located at or near the airport field 202; terrain (e.g., mountains) located beyond the airport field 202; runway edges, shoulders, elevation, heading, identification, intersections, length, centerlines, landing length, markings, etc.; taxiway centerlines; taxiway edges or boundaries; taxiway shoulders; and airport terrain features. Of course, the various graphical features rendered at any given time with a synthetic display will vary depending upon the particular airport of interest, the current position and heading of the aircraft, the desired amount of graphical detail and/or resolution, etc.

The airport field 202 is rendered in a manner that appears conformal to the earth. In other words, the synthetic display 200 emulates a realistic view of the airport field 202 from the flight deck or cockpit perspective. Thus, as the aircraft changes position and/or heading, the synthetic display 200 will be updated to preserve the conformal appearance of the airport field 202. This effectively simulates the visual appearance that crew members would see looking out the front cockpit windows.

The synthetic display 200 includes runway signage that is conformally rendered on a runway 204. For example, FIG. 2 shows the graphical representation of the runway signage 206 rendered on the exposed runway surface 208 that includes the identifier "25L." It also includes upstanding signboards or markers 210 on one or both sides of runway 204. These markers graphically represent the distance to the end of runway 204. At the moment in time captured by FIG. 2, the aircraft proceeding down runway 25L is approaching markers 210 indicating that 7000 feet of runway 25L. Such signboards will typically be generated every 1000 feet and more frequently as the aircraft approaches the end-of-runway as stated above.

As stated previously, the dynamic synthetic display of FIG. 2 rendered on the flight deck display element will typically include a graphical representation of taxiway signage, runway signage, or both including distance to end-of-runway at, for example, every one thousand feet. However, in the case of an intersecting runway, there are no markings identifying the runway. Thus, it is possible the aircraft may enter onto and proceed in the wrong direction on the runway. Furthermore, since there are no distance-to-end-of-runway indicators, there may not be sufficient runway for a safe takeoff.

Figure 3:
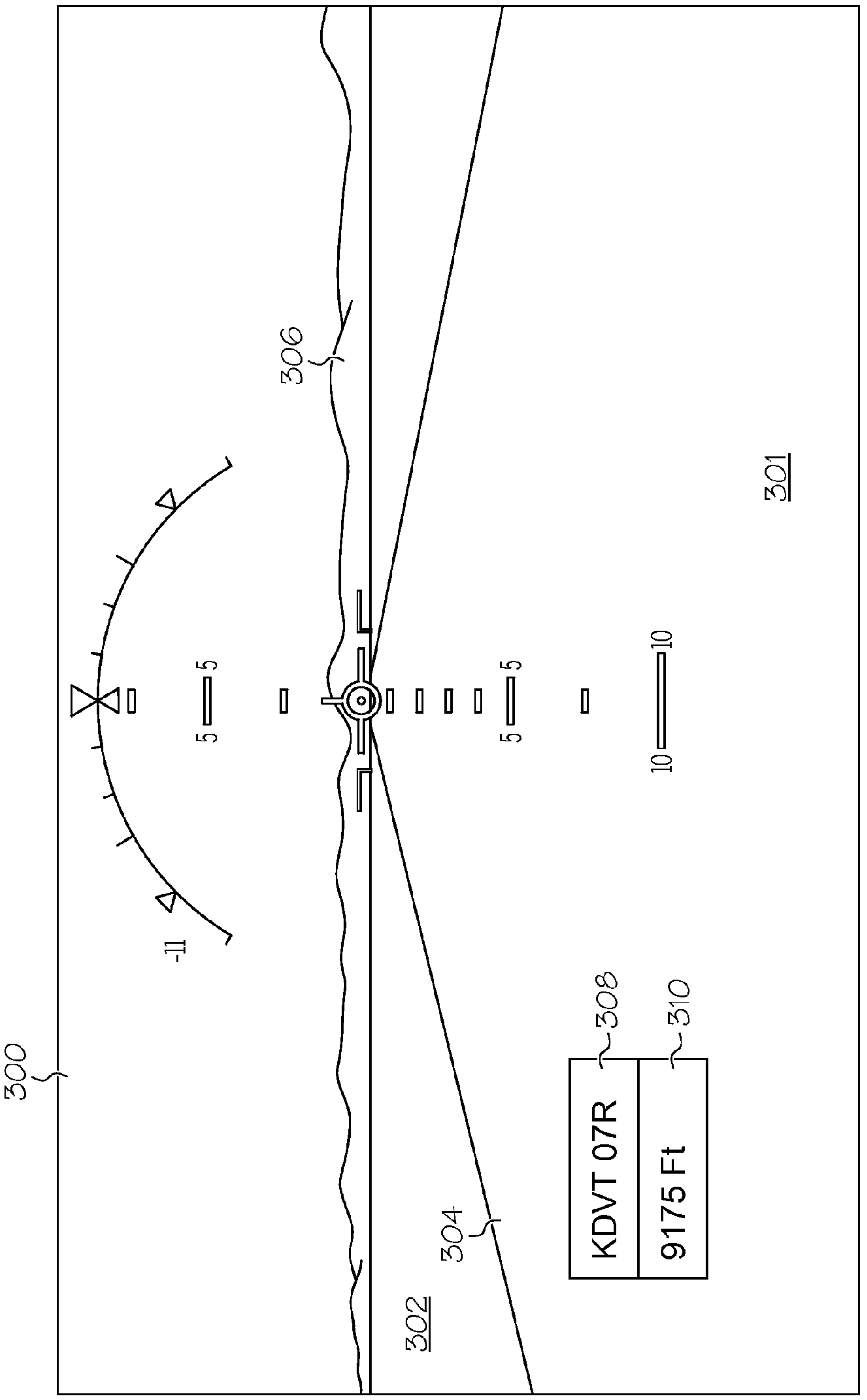
FIG. 3 is a graphical representation of a synthetic display at a runway intersection in accordance with an exemplary embodiment.

To this end, FIG. 3 illustrates a dynamic synthetic display presented on a flight deck display element that includes a graphical representation of at least one runway 304 having an exposed surface 301. FIG. 3 depicts a synthetic display of an exemplary airport field 302, similar to that shown in FIG. 2, at a particular moment in time as viewed from inside the cockpit of a landing aircraft. In this case, however, since the aircraft has entered the runway at an intersection, synthetic display 300 does not include runway or distance signage rendered on runway 304 as was the case in FIG. 2. Therefore, in accordance with an exemplary embodiment, FIG. 3 depicts a dynamic synthetic display presented on a flight deck display element that includes a graphical representation of (1) the identity 308 of a runway that has been entered upon via an intersection, (2) the distance 310 to the end of the runway, (3) a warning that the aircraft is moving in the wrong direction on the runway, and (4) a warning that there is insufficient runway remaining for a safe takeoff.

Figure 4:
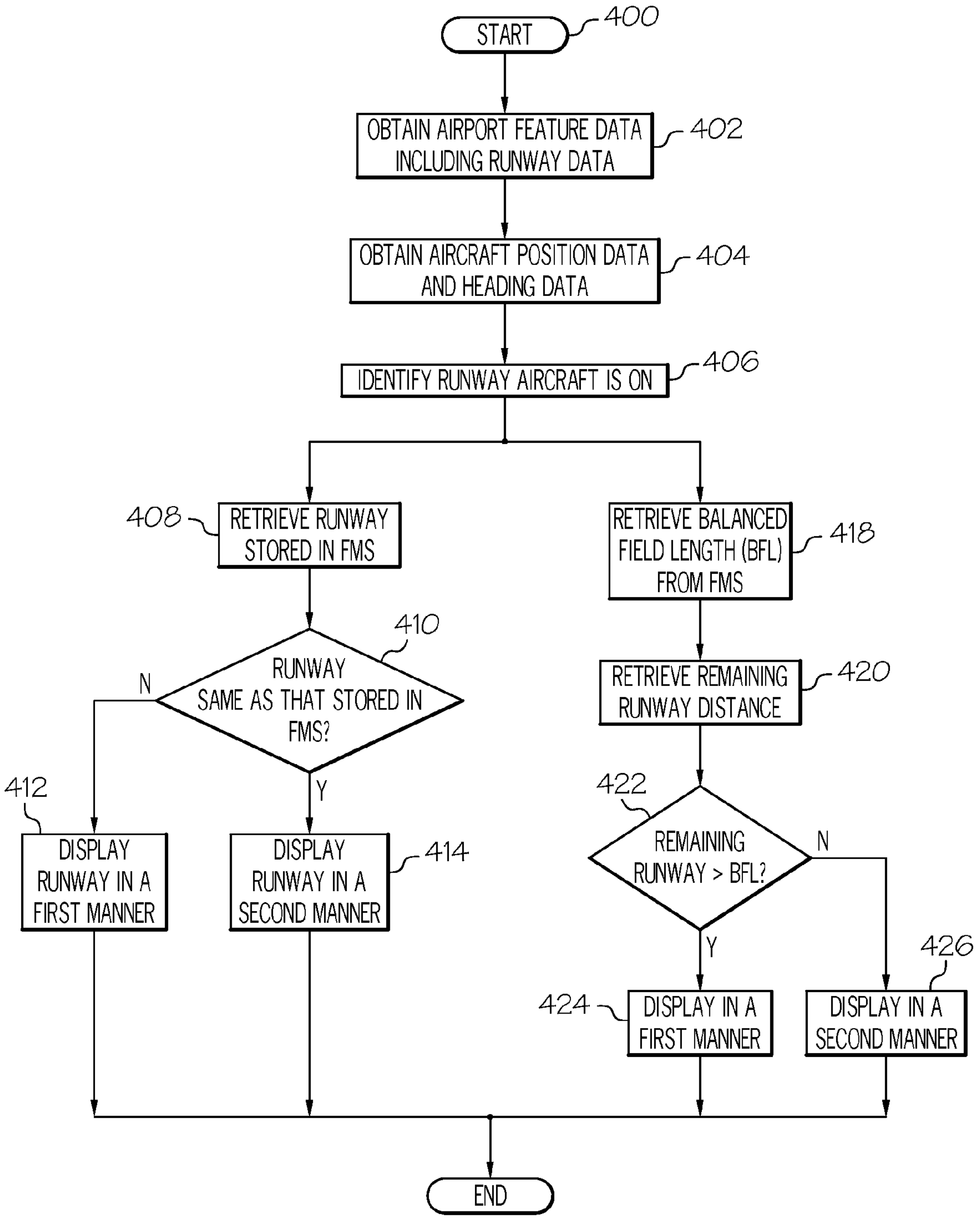
FIG. 4 is a flow chart that illustrates an exemplary embodiment of a synthetic display rendering process in accordance with an exemplary embodiment.

FIG. 4 is a flow chart 400 that illustrates an exemplary embodiment of a variable display characteristics process that may be performed by an embodiment of the flight deck display system shown and described in connection with FIG. 1. The various tasks performed in connection with process 400 may be performed by software, hardware, firmware, or any combination thereof. For illustrative purposes, the following description of the process 400 may refer to elements mentioned above in connection with FIG. 1. In practice, portions of the process 400 may be performed by different elements of the described system, such as the processing architecture or the display element. It should be appreciated that the process 400 may include any number of additional or alternative tasks, the tasks shown in FIG. 4 need not be performed in the illustrated order, and the process 400 may be incorporated into a more comprehensive procedure or process having additional functionality not described in detail herein. In particular, the process 400 could be integrated with or cooperatively performed with the process described previously.

In connection with the process 400, the flight deck display system analyzes and/or processes (1) airport feature data, runway data (length and the approximate time required for the aircraft to reach a designated feature such as the end of the runway) (STEP 402), and (2) current geographic position data including the current heading data for the aircraft (STEP 404). Next, the process 400 identifies the runway that the aircraft has entered upon (STEP 406), and this is compared (STEP 410) with the runway identified and stored on the aircraft; e.g. stored in the FMS (STEP 408). If the stored runway identity matches the runway identified in STEP 406, the runway identity is displayed at 308 (FIG. 3) in a first manner; e.g. in green (STEP 412), and the process ends (STEP 416). If, on the other hand, the runway stored on the aircraft does not match the runway that the aircraft is on (STEP 410) (i.e. the aircraft is headed in the wrong direction), the runway identity is displayed in a second manner; e.g. in green (STEP 414) and the process ends (STEP 416).

In STEP 418, the computed runway distance required for safe takeoff is retrieved, and in STEP 420, the remaining runway distance is determined from the runway data. These are compared in STEP 422. If the balanced field length (STEP 424) is less than the remaining runway length, the remaining runway length is displayed in a first manner; (e.g. in green) (STEP 424), and the process ends (STEP 416). If, on the other hand, the balanced field length (STEP 424) is not less than the remaining runway length, the remaining runway length is displayed in a second manner; (e.g. red or yellow) (STEP 426), and the process ends (STEP 416).

Thus, it should be appreciated that there has been provided a dynamic synthetic display on a flight deck display element that includes a graphical representation of (1) the identity 308 of a runway that has been entered upon via an intersection, (2) the distance 310 to the end of the runway, (3) a warning that the aircraft is moving in the wrong direction on the runway, and (4) a warning that there is insufficient runway remaining for a safe takeoff.

While an exemplary embodiment of the present invention has been described above in the context of a fully functioning computer system (i.e., avionics display system 300), those skilled in the art will recognize that the mechanisms of the present invention are capable of being distributed as a program product (i.e., an avionics display program) and, furthermore, that the teachings of the present invention apply to the program product regardless of the particular type of computer-readable media (e.g., floppy disc, hard drive, memory card, optical disc, etc.) employed to carry-out its distribution. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for determining when an aircraft is headed in the right direction on a runway entered upon at a location that does not display runway identification, comprising:

receiving runway data;

receiving aircraft position data;

determining the identity of the runway from the runway data and the aircraft position data; and comparing the identity of the runway with a representation of an assigned runway stored on the aircraft to determine that they match; retrieving a balanced field length;

determining the remaining runway distance from the runway data and the position data;

displaying the remaining runway distance in a first manner when the remaining runway distance is greater that the balanced field length; and displaying the remaining runway distance in a second manner when the remaining runway distance is less than the balanced field length.

2. The method of claim 1 wherein the step of comparing comprises retrieving the assigned runway from the FMS.

3. The method of claim 1 further comprising displaying the identity of the runway in a first manner when they match.

4. The method of claim 3 further comprising displaying the identity of the runway in a second manner when they do not match.

5. The method of claim 4 further comprising displaying the identity of the runway in a first color when they match.

6. The method of claim 5 further comprising displaying the identity of the runway in a second color when they do not match.

7. The method of claim 6 further comprising displaying the identity of the runway in green when they match.

8. The method of claim 7 further comprising displaying the identity of the runway in red when they do not match.

9. The method of claim 1 further comprising displaying the remaining runway length in a first manner when the remaining runway distance is greater than the balanced field length.

10. The method of claim 9 further comprising displaying the remaining runway length in a second manner when the remaining runway distance is less than the balanced field length.

11. The method of claim 10 further comprising displaying the identity of the runway in a first color when the remaining runway distance is greater than the balanced field length.

12. The method of claim 11 further comprising displaying the identity of the runway in a second color when the remaining runway distance is less than the balanced field length.

13. The method of claim 12 further comprising displaying the remaining runway length in green when the remaining runway distance is greater that the balanced field length.

14. The method of claim 13 further comprising displaying the remaining runway length in red when the remaining runway distance is less than the balanced field length.

15. The method of claim 14 further comprising displaying the remaining runway in yellow when the remaining runway distance is less than the balanced field length.

16. A system for determining when an aircraft is headed in the right direction on a runway entered upon at a location that does not display runway identification, comprising:

a first source of runway data;

a second source of aircraft position data; and a processor coupled to the first and second sources and configured to (1) determine the identity of the runway from the runway data and the aircraft position data; and (2) compare the identity of the runway with a representation of an assigned runway stored on the aircraft to determine when they match; (3) retrieve a balanced field length; (4) determine the remaining runway distance from the runway data and the position data; (5) display the remaining runway distance in a first manner when the remaining runway distance is greater that the balanced field length; and (6) display the remaining runway distance in a second manner when the remaining runway distance is less than the balanced field length.

* * * * *